(12) United States Patent
De Vis et al.

(10) Patent No.: US 12,099,246 B2
(45) Date of Patent: Sep. 24, 2024

(54) TELECOMMUNICATIONS DISTRIBUTION ELEMENTS

(71) Applicant: COMMSCOPE CONNECTIVITY BELGIUM BVBA, Kessel-Lo (BE)

(72) Inventors: Willem Lea Marcel De Vis, Merchtem (BE); David Jan Irma Van Baelen, Winksele (BE); Eric Marcel M. Keustermans, Houwaart (BE); Heidi Bleus, Genk (BE); Geert Antoon Parton, Lubbeek (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 244 days.

(21) Appl. No.: 17/794,921

(22) PCT Filed: Jan. 21, 2021

(86) PCT No.: PCT/EP2021/051368
§ 371 (c)(1),
(2) Date: Jul. 22, 2022

(87) PCT Pub. No.: WO2021/148552
PCT Pub. Date: Jul. 29, 2021

(65) Prior Publication Data
US 2023/0111957 A1    Apr. 13, 2023

Related U.S. Application Data

(60) Provisional application No. 62/965,241, filed on Jan. 24, 2020.

(51) Int. Cl.
G02B 6/00    (2006.01)
G02B 6/44    (2006.01)

(52) U.S. Cl.
CPC ......... G02B 6/4452 (2013.01); G02B 6/4455 (2013.01)

(58) Field of Classification Search
CPC ................ G02B 6/4452; G02B 6/4455; G02B 6/44526; G02B 6/00
See application file for complete search history.

(56) References Cited

U.S. PATENT DOCUMENTS 2,805,106 A    9/1957  Penkala
2,864,656 A   12/1958  Yorinks
(Continued)

FOREIGN PATENT DOCUMENTS

AU    40995/85    4/1985
AU    55314/86    3/1986
(Continued)

OTHER PUBLICATIONS

International Search Report and Written Opinion of the International Searching Authority for International Patent Application No. PCT/EP2021/051368 mailed May 4, 2021, 12 pages.
(Continued)

Primary Examiner — Jennifer Doan
(74) Attorney, Agent, or Firm — Merchant & Gould P.C.

(57) ABSTRACT

An optical fiber distribution element includes a chassis defining an interior; a movable tray slidably movable from within the chassis to a position at least partially outside the chassis, the tray defining a front end and a rear end; a slide mechanism which connects the movable tray to the chassis; at least one hingedly mounted frame member within the tray which hinges about an axis perpendicular to the direction of movement of the movable tray; and a cover mounted adjacent the rear end of the tray and movable between an access position and an operational position when the tray is in the open position, only the operational position of the cover (Continued)

allowing the tray to move from the open position to the closed position, the access position al lowing access to the at least one hingedly mounted frame member, and the cover in the access position preventing the tray from moving from the open to the closed position.

12 Claims, 10 Drawing Sheets

(56) References Cited

U.S. PATENT DOCUMENTS

| | | |
|---|---|---|
| 3,901,564 A | 8/1975 | Armstrong |
| 4,070,076 A | 1/1978 | Zwillinger |
| 4,172,625 A | 10/1979 | Swain |
| 4,320,934 A | 3/1982 | Röck et al. |
| 4,359,262 A | 11/1982 | Dolan |
| 4,373,776 A | 2/1983 | Purdy |
| 4,494,806 A | 1/1985 | Williams et al. |
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,737,039 A | 4/1988 | Sekerich |
| 4,765,710 A | 8/1988 | Burmeister et al. |
| 4,792,203 A | 12/1988 | Nelson et al. |
| 4,820,007 A | 4/1989 | Ross et al. |
| 4,840,449 A | 6/1989 | Ghandeharizadeh |
| 4,898,448 A | 2/1990 | Cooper |
| 4,971,421 A | 11/1990 | Ori |
| 4,986,762 A | 1/1991 | Keith |
| 4,991,928 A | 2/1991 | Zimmer |
| 4,995,688 A | 2/1991 | Anton et al. |
| 5,024,498 A | 6/1991 | Becker et al. |
| 5,066,149 A | 11/1991 | Wheeler et al. |
| 5,067,678 A | 11/1991 | Henneberger et al. |
| 5,071,211 A | 12/1991 | Debortoli et al. |
| 5,100,221 A | 3/1992 | Carney et al. |
| 5,127,082 A | 6/1992 | Below et al. |
| 5,129,030 A | 7/1992 | Petrunia |
| 5,138,688 A | 8/1992 | Debortoli |
| 5,142,606 A | 8/1992 | Carney et al. |
| 5,142,607 A | 8/1992 | Petrotta et al. |
| 5,167,001 A | 11/1992 | Debortoli et al. |
| 5,174,675 A | 12/1992 | Martin |
| 5,240,209 A | 8/1993 | Kutsch |
| 5,247,603 A | 9/1993 | Vidacovich et al. |
| 5,275,064 A | 1/1994 | Hobbs |
| 5,285,515 A | 2/1994 | Milanowski et al. |
| 5,289,558 A | 2/1994 | Teichler et al. |
| 5,316,243 A | 5/1994 | Henneberger |
| 5,323,480 A | 6/1994 | Mullaney et al. |
| 5,335,349 A | 8/1994 | Kutsch et al. |
| 5,339,379 A | 8/1994 | Kutsch et al. |
| 5,353,367 A | 10/1994 | Czosnowski et al. |
| 5,363,466 A | 11/1994 | Milanowskki et al. |
| 5,363,467 A | 11/1994 | Keith |
| 5,402,515 A | 3/1995 | Vidacovich et al. |
| 5,412,751 A | 5/1995 | Siemon et al. |
| 5,430,823 A | 7/1995 | Dupont et al. |
| 5,438,641 A | 8/1995 | Malacarne |
| 5,490,229 A | 2/1996 | Ghanderharizadeh et al. |
| 5,497,444 A | 3/1996 | Wheeler |
| 5,509,096 A | 4/1996 | Easley |
| 5,511,144 A | 4/1996 | Hawkins et al. |
| 5,530,783 A | 6/1996 | Belopolsky et al. |
| 5,570,450 A | 10/1996 | Fernandez et al. |
| 5,613,030 A | 3/1997 | Hoffer et al. |
| 5,640,481 A | 6/1997 | Llewellyn et al. |
| 5,655,044 A | 8/1997 | Finzel et al. |
| 5,715,348 A | 2/1998 | Falkenberg et al. |
| 5,717,810 A | 2/1998 | Wheeler |
| 5,717,811 A | 2/1998 | Macken |
| 5,724,469 A | 3/1998 | Orlando |
| 5,802,237 A | 9/1998 | Pulido |
| 5,811,055 A | 9/1998 | Geiger |
| 5,836,148 A | 11/1998 | Fukao |
| 5,882,100 A | 3/1999 | Rock |
| 5,887,106 A | 3/1999 | Cheeseman et al. |
| 5,917,984 A | 6/1999 | Röseler et al. |
| 5,923,753 A | 7/1999 | Haataja et al. |
| 5,946,440 A | 8/1999 | Puetz |
| 5,966,492 A | 10/1999 | Bechamps et al. |
| 5,971,626 A | 10/1999 | Knodell et al. |
| 5,975,769 A | 11/1999 | Larson et al. |
| 5,978,540 A | 11/1999 | Bechamps et al. |
| 6,009,224 A | 12/1999 | Allen |
| 6,022,150 A | 2/2000 | Erdman et al. |
| 6,027,252 A | 2/2000 | Erdman et al. |
| 6,044,194 A | 3/2000 | Meyerhoefer |
| 6,076,908 A | 6/2000 | Maffeo |
| 6,099,224 A | 8/2000 | Uchida et al. |
| 6,215,938 B1 | 4/2001 | Reitmeier et al. |
| 6,226,436 B1 | 5/2001 | Daoud et al. |
| 6,236,795 B1 | 5/2001 | Rodgers |
| 6,256,444 B1 | 7/2001 | Bechamps et al. |
| 6,263,141 B1 | 7/2001 | Smith |
| 6,269,214 B1 | 7/2001 | Naudin et al. |
| 6,301,424 B1 | 10/2001 | Hwang |
| 6,360,050 B1 | 3/2002 | Moua et al. |
| 6,381,393 B1 | 4/2002 | Matthews et al. |
| 6,438,310 B1 | 8/2002 | Lance et al. |
| 6,439,523 B1 | 8/2002 | Chandler et al. |
| 6,480,660 B1 | 11/2002 | Reitmeier et al. |
| 6,496,638 B1 | 12/2002 | Andersen |
| 6,504,988 B1 | 1/2003 | Trebesch et al. |
| 6,591,051 B2 | 7/2003 | Solheid et al. |
| 6,594,434 B1 | 7/2003 | Davidson et al. |
| 6,600,866 B2 | 7/2003 | Gatica et al. |
| 6,612,515 B1 | 9/2003 | Tinucci et al. |
| 6,625,374 B2 | 9/2003 | Holman et al. |
| RE38,311 E | 11/2003 | Wheeler |
| 6,677,520 B1 | 1/2004 | Kim et al. |
| 6,695,491 B1 | 2/2004 | Leeman et al. |
| 6,711,339 B2 | 3/2004 | Puetz et al. |
| 6,715,619 B2 | 4/2004 | Kim et al. |
| 6,748,155 B2 | 6/2004 | Kim et al. |
| 6,768,860 B2 | 7/2004 | Liberty |
| 6,796,437 B2 | 9/2004 | Krampotich et al. |
| 6,804,447 B2 | 10/2004 | Smith et al. |
| 6,809,258 B1 | 10/2004 | Dang et al. |
| 6,810,193 B1 | 10/2004 | Müller |
| 6,819,857 B2 | 11/2004 | Douglas et al. |
| 6,845,208 B2 | 1/2005 | Thibault et al. |
| 6,850,685 B2 | 2/2005 | Tinucci et al. |
| 6,865,331 B2 | 3/2005 | Mertesdorf |
| 6,870,734 B2 | 3/2005 | Mertesdorf et al. |
| 6,915,057 B2 | 7/2005 | Vincent et al. |
| 6,925,241 B2 | 8/2005 | Bohle et al. |
| 6,934,457 B2 | 8/2005 | Vincent et al. |
| 6,937,807 B2 | 8/2005 | Franklin et al. |
| 6,944,383 B1 | 9/2005 | Herzog et al. |
| 6,945,620 B2 | 9/2005 | Lam et al. |
| 6,968,111 B2 | 11/2005 | Trebesch et al. |
| 6,981,750 B2 | 1/2006 | Krampotich |
| 7,006,748 B2 | 2/2006 | Dagley et al. |
| 7,068,907 B2 | 6/2006 | Schray |
| 7,079,744 B2 | 7/2006 | Douglas et al. |
| 7,086,539 B2 | 8/2006 | Knudsen et al. |
| 7,116,777 B2 | 10/2006 | Knudsen et al. |
| 7,120,348 B2 | 10/2006 | Trebesch et al. |
| 7,171,099 B2 | 1/2007 | Barnes et al. |
| 7,231,125 B2 | 6/2007 | Douglas et al. |
| 7,274,852 B1 | 9/2007 | Smrha et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,362,942 B2 | 4/2008 | Beck |
| 7,367,823 B2 | 5/2008 | Rapp et al. |
| 7,373,071 B2 | 5/2008 | Douglas et al. |

(56) References Cited

U.S. PATENT DOCUMENTS

| | | |
|---|---|---|
| 7,397,996 B2 | 7/2008 | Herzog et al. |
| 7,406,240 B2 | 7/2008 | Murano |
| 7,409,137 B1 | 8/2008 | Barnes |
| 7,418,182 B2 | 8/2008 | Krampotich |
| 7,437,049 B2 | 10/2008 | Krampotich |
| 7,454,113 B2 | 11/2008 | Barnes |
| 7,457,504 B2 | 11/2008 | Smrha et al. |
| 7,460,757 B2 | 12/2008 | Hoehne et al. |
| 7,463,811 B2 | 12/2008 | Trebesch et al. |
| 7,480,438 B2 | 1/2009 | Douglas et al. |
| 7,496,268 B2 | 2/2009 | Escoto et al. |
| 7,499,623 B2 | 3/2009 | Barnes et al. |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,599,599 B2 | 10/2009 | Herzog et al. |
| 7,664,361 B2 | 2/2010 | Trebesch et al. |
| 7,689,089 B2 | 3/2010 | Wagner et al. |
| 7,706,656 B2 | 4/2010 | Zimmel |
| 7,715,681 B2 | 5/2010 | Krampotich et al. |
| 7,747,125 B1 | 6/2010 | Lee et al. |
| RE41,460 E | 7/2010 | Wheeler |
| 7,751,674 B2 | 7/2010 | Hill |
| 7,764,859 B2 | 7/2010 | Krampotich et al. |
| 7,856,166 B2 | 12/2010 | Biribuze et al. |
| 7,869,683 B2 | 1/2011 | Barnes et al. |
| 7,876,993 B2 | 1/2011 | Krampotich et al. |
| 7,889,961 B2 | 2/2011 | Cote et al. |
| 7,978,957 B2 | 7/2011 | Sano et al. |
| 8,027,558 B2 | 9/2011 | Barnes et al. |
| 8,041,175 B2 | 10/2011 | Krampotich et al. |
| 8,059,932 B2 | 11/2011 | Hill et al. |
| 8,078,030 B2 | 12/2011 | Trebesch et al. |
| 8,179,684 B2 | 5/2012 | Smrha et al. |
| 8,195,022 B2 | 6/2012 | Coburn et al. |
| 8,285,104 B2 | 10/2012 | Davis et al. |
| 8,315,498 B2 | 11/2012 | Redmann et al. |
| 8,452,149 B2 | 5/2013 | Krampotich et al. |
| 8,526,774 B2 | 9/2013 | Krampotich et al. |
| 8,559,785 B2 | 10/2013 | Barlowe et al. |
| 8,600,208 B2 | 12/2013 | Badar et al. |
| 8,639,081 B2 | 1/2014 | Barnes et al. |
| 8,655,136 B2 | 2/2014 | Trebesch et al. |
| 8,690,593 B2 | 4/2014 | Anderson et al. |
| 8,731,361 B2 | 5/2014 | Anderson et al. |
| 8,801,299 B2 | 8/2014 | Shimotsu et al. |
| 8,816,222 B2 | 8/2014 | Pimentel |
| 8,864,085 B2 | 10/2014 | He et al. |
| 8,885,998 B2 | 11/2014 | Marcouiller et al. |
| 8,903,216 B2 | 12/2014 | Thompson et al. |
| 9,081,164 B2 | 7/2015 | Badar et al. |
| 9,128,262 B2 | 9/2015 | Campbell et al. |
| 9,435,975 B2 | 9/2016 | Ott |
| 9,541,726 B2 | 1/2017 | Geens et al. |
| 9,568,699 B2 | 2/2017 | Geens et al. |
| 9,684,143 B2 * | 6/2017 | Chen ................ F16B 21/09 |
| 9,958,631 B2 | 5/2018 | Geens et al. |
| 10,107,984 B2 | 10/2018 | Geens et al. |
| 10,126,515 B2 | 11/2018 | Geens et al. |
| 10,345,546 B2 | 7/2019 | Geens et al. |
| 10,409,020 B2 * | 9/2019 | Geens ................ F16M 13/02 |
| 10,732,373 B2 | 8/2020 | Geens et al. |
| 10,746,950 B2 | 8/2020 | Geens et al. |
| 11,002,936 B2 | 5/2021 | Geens et al. |
| 11,199,674 B2 * | 12/2021 | Allen ................ G02B 6/4453 |
| 11,320,618 B2 | 5/2022 | Geens et al. |
| 2001/0001270 A1 | 5/2001 | Williams Vigliaturo |
| 2002/0131750 A1 | 9/2002 | Holman et al. |
| 2002/0159746 A1 | 10/2002 | Howell et al. |
| 2002/0181922 A1 | 12/2002 | Xin et al. |
| 2003/0007767 A1 | 1/2003 | Douglas et al. |
| 2003/0020379 A1 | 1/2003 | Larsen et al. |
| 2003/0119385 A1 | 6/2003 | Elliot et al. |
| 2003/0128951 A1 | 7/2003 | Lecomte et al. |
| 2003/0165315 A1 | 9/2003 | Trebesch et al. |
| 2003/0174996 A1 | 9/2003 | Henschel et al. |
| 2003/0190035 A1 | 10/2003 | Knudsen et al. |
| 2004/0011750 A1 | 1/2004 | Kim et al. |
| 2004/0136676 A1 | 7/2004 | Mertesdorf |
| 2004/0175090 A1 | 9/2004 | Vastmans et al. |
| 2004/0227443 A1 | 11/2004 | Sandoval |
| 2004/0228582 A1 | 11/2004 | Yamada et al. |
| 2004/0258384 A1 | 12/2004 | Trebesch et al. |
| 2005/0025444 A1 | 2/2005 | Barnes et al. |
| 2005/0058421 A1 | 3/2005 | Dagley et al. |
| 2005/0078929 A1 | 4/2005 | Iwanek |
| 2005/0100301 A1 | 5/2005 | Solheid et al. |
| 2005/0123261 A1 | 6/2005 | Bellekens et al. |
| 2006/0093302 A1 | 5/2006 | Solheid et al. |
| 2006/0116084 A1 | 6/2006 | Miki et al. |
| 2006/0193586 A1 | 8/2006 | Hoehne et al. |
| 2006/0275008 A1 | 12/2006 | Xin |
| 2007/0003204 A1 | 1/2007 | Makrides-Saravanos et al. |
| 2007/0031099 A1 | 2/2007 | Herzog et al. |
| 2007/0058918 A1 | 3/2007 | Trebesch et al. |
| 2007/0201806 A1 | 8/2007 | Douglas et al. |
| 2007/0280618 A1 | 12/2007 | Xin et al. |
| 2008/0048935 A1 | 2/2008 | Yoshioka et al. |
| 2008/0050083 A1 | 2/2008 | Frazier et al. |
| 2008/0063350 A1 | 3/2008 | Trebesch et al. |
| 2008/0124038 A1 | 5/2008 | Kowalczyk et al. |
| 2008/0169116 A1 | 7/2008 | Mullaney et al. |
| 2008/0175550 A1 | 7/2008 | Coburn et al. |
| 2008/0205843 A1 | 8/2008 | Castonguay et al. |
| 2008/0292260 A1 | 11/2008 | Weinegger et al. |
| 2008/0298026 A1 | 12/2008 | Wang et al. |
| 2009/0060439 A1 | 3/2009 | Cox et al. |
| 2009/0067800 A1 | 3/2009 | Vazquez et al. |
| 2009/0067802 A1 | 3/2009 | Hoehne et al. |
| 2009/0097813 A1 | 4/2009 | Hill |
| 2009/0129033 A1 | 5/2009 | Smrha et al. |
| 2009/0136196 A1 | 5/2009 | Trebesch et al. |
| 2009/0245746 A1 | 10/2009 | Krampotich et al. |
| 2009/0274430 A1 | 11/2009 | Krampotich et al. |
| 2009/0274431 A1 | 11/2009 | Krampotich et al. |
| 2010/0061693 A1 | 3/2010 | Bran De Leon et al. |
| 2010/0142910 A1 | 6/2010 | Hill et al. |
| 2010/0150518 A1 | 6/2010 | Leon et al. |
| 2010/0158465 A1 | 6/2010 | Smrha |
| 2010/0195968 A1 | 8/2010 | Trebesch et al. |
| 2010/0266253 A1 | 10/2010 | Krampotich et al. |
| 2010/0310225 A1 | 12/2010 | Anderson et al. |
| 2010/0316346 A1 | 12/2010 | Krampotich et al. |
| 2010/0322578 A1 | 12/2010 | Cooke et al. |
| 2011/0123165 A1 | 5/2011 | Barth et al. |
| 2011/0188809 A1 | 8/2011 | LeBlanc et al. |
| 2011/0206336 A1 | 8/2011 | Krampotich et al. |
| 2011/0211329 A1 | 9/2011 | Dean, Jr. et al. |
| 2011/0211799 A1 | 9/2011 | Conner et al. |
| 2011/0211801 A1 | 9/2011 | McGranahan et al. |
| 2011/0217016 A1 | 9/2011 | Mullsteff |
| 2011/0228473 A1 | 9/2011 | Anderson et al. |
| 2011/0267794 A1 | 11/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0286712 A1 | 11/2011 | Puetz et al. |
| 2011/0317974 A1 | 12/2011 | Krampotich et al. |
| 2012/0057838 A1 | 3/2012 | Hill et al. |
| 2012/0093475 A1 | 4/2012 | Trebesch et al. |
| 2012/0230646 A1 | 9/2012 | Thompson et al. |
| 2013/0028567 A1 | 1/2013 | Parikh et al. |
| 2013/0034334 A1 | 2/2013 | Fariello et al. |
| 2013/0084050 A1 | 4/2013 | Vastmans et al. |
| 2013/0089292 A1 | 4/2013 | Ott et al. |
| 2013/0089298 A1 | 4/2013 | Holmberg et al. |
| 2013/0183018 A1 | 7/2013 | Holmberg |
| 2013/0287356 A1 | 10/2013 | Solheid |
| 2013/0287357 A1 | 10/2013 | Solheid et al. |
| 2014/0086545 A1 | 3/2014 | Solheid et al. |
| 2014/0133819 A1 | 5/2014 | Trebesch et al. |
| 2014/0241691 A1 | 8/2014 | Solheid et al. |
| 2015/0378106 A1 | 12/2015 | Allen et al. |

(56) References Cited

U.S. PATENT DOCUMENTS

| | | |
|---|---|---|
| 2015/0380918 A1 | 12/2015 | Kellerman |
| 2017/0293099 A1 | 10/2017 | Alexi et al. |
| 2018/0123273 A1 | 5/2018 | Ishii et al. |
| 2018/0172941 A1 | 6/2018 | Ruiz |
| 2018/0348463 A1 | 12/2018 | Geens et al. |
| 2019/0025521 A1 | 1/2019 | Geens et al. |
| 2021/0011243 A1 | 1/2021 | Geens et al. |
| 2021/0181430 A1 | 6/2021 | Van Baelen et al. |
| 2021/0181446 A1 | 6/2021 | Van Baelen et al. |
| 2021/0181447 A1 | 6/2021 | Van Baelen et al. |
| 2021/0181448 A1 | 6/2021 | Van Baelen et al. |
| 2021/0181449 A1 | 6/2021 | Van Baelen et al. |
| 2021/0271045 A1 | 9/2021 | Geens et al. |
| 2022/0221675 A1 | 7/2022 | Geens et al. |

FOREIGN PATENT DOCUMENTS

| | | |
|---|---|---|
| AU | 2010246577 A1 | 12/2010 |
| CN | 1133640 A | 10/1996 |
| CN | 1319194 A | 10/2001 |
| CN | 1448746 A | 10/2003 |
| CN | 201335897 Y | 10/2009 |
| CN | 102483500 A | 5/2012 |
| DE | 27 35 106 A1 | 2/1979 |
| DE | 29 18 309 A1 | 11/1980 |
| DE | 33 08 682 A1 | 9/1984 |
| DE | 38 36 273 A1 | 4/1990 |
| DE | 44 13 136 C1 | 5/1995 |
| DE | 295 04 191 U1 | 3/1996 |
| EP | 0 146 478 A2 | 6/1985 |
| EP | 0 149 250 A2 | 7/1985 |
| EP | 0 356 942 A2 | 3/1990 |
| EP | 0 406 151 A2 | 1/1991 |
| EP | 0 464 570 A1 | 1/1992 |
| EP | 0 479 226 A1 | 4/1992 |
| EP | 0 196 102 B1 | 3/1993 |
| EP | 0 538 164 A1 | 4/1993 |
| EP | 0 563 995 B1 | 10/1999 |
| EP | 1 228 389 B1 | 5/2003 |
| EP | 2 093 596 A2 | 8/2009 |
| EP | 2 450 729 A2 | 5/2012 |
| FR | 2 531 576 A1 | 2/1984 |
| FR | 2 587 127 A1 | 3/1987 |
| FR | 2 678 076 A1 | 12/1992 |
| JP | 59-74523 A | 4/1984 |
| JP | 60-169811 A | 9/1985 |
| JP | 61-55607 A | 3/1986 |
| JP | 61-90104 A | 5/1986 |
| JP | 2000-286574 A | 10/2000 |
| KR | 20-0337929 Y1 | 1/2004 |
| KR | 10-2008-0033420 A | 4/2008 |
| RU | 45207 U1 | 4/2005 |
| WO | 91/10927 A1 | 7/1991 |
| WO | 95/07480 A1 | 3/1995 |
| WO | 96/10203 A1 | 4/1996 |
| WO | 99/00619 A1 | 1/1999 |
| WO | 99/38042 A1 | 7/1999 |
| WO | 03/005095 A2 | 1/2003 |
| WO | 2008/048935 A2 | 4/2008 |
| WO | 2009/032330 A1 | 3/2009 |
| WO | 2011/100616 A2 | 8/2011 |
| WO | 2012/068013 A2 | 5/2012 |
| WO | 2014/090843 A1 | 6/2014 |
| WO | 2014/118227 A1 | 8/2014 |
| WO | 2014/173896 A1 | 10/2014 |
| WO | 2014/173930 A1 | 10/2014 |
| WO | 2014/207210 A1 | 12/2014 |
| WO | 2015/055586 A1 | 4/2015 |
| WO | 2016/012550 A2 | 1/2016 |
| WO | 2016/156611 A1 | 10/2016 |
| WO | 2019/201878 A1 | 10/2019 |

OTHER PUBLICATIONS

Extended European Search Report for Application No. 20172802.9 mailed Aig. 20, 2020.

International Search Report for International Application No. PCT/EP2014/051714 mailed Apr. 29, 2014 (2 pages).

International Search Report and Written Opinion for International Application No. PCT/EP2014/058136 mailed Jul. 11, 2014 (9 pages).

International Search Report and Written Opinion for International Application No. PCT/EP2014/058196 mailed Jul. 31, 2014 (10 pages).

AT&T Product Bulletin 2987D-DLH-7/89, "High Density Interconnect System (HDIC)," Issue 2 (Copyright 1989).

"ITU Fiber Handbook" with English translation, 14 pages, Mar. 1992.

Northern Telecom Bulletin #91-004, Issue #2, May 1991.

"Precision Mechanical" with English translation, 5 pages.

Preface to the book "Structure, Installation, Connection and Protection of Communication Optical Fiber Cable," in Chinese with English Translation, 14 pages (Mar. 1992).

Complaint relating to Civil Action No. 5:11-cv-02509-JS, *ADC Telecommunications, Inc v. Opterna Am, Inc*. filed Apr. 11, 2011 (14 pages).

Complaint relating to Civil Action No. 1:11cv-735 (GBL-IDD), *ADC Telecommunications, Inc v. Opterna Am, Inc*. filed Jul. 12, 2011 (5 pages).

Plaintiff's Notice of Dismissal relating to Civil Action No. 5:11-cv-02509-JS, *ADC Telecommunications, Inc v. Opterna Am, Inc*. filed Jul. 12, 2011 (1 page).

Stipulation and Order of Dismissal relating to Civil Action No. 1:11-cv-735-GBL-IDD, *ADC Telecommunications, Inc v. Opterna Am, Inc*. filed Feb. 21, 2012 (2 pages).

* cited by examiner

TELECOMMUNICATIONS DISTRIBUTION ELEMENTS

CROSS-REFERENCE TO RELATED APPLICATION

This application is a National Stage Application of PCT/EP2021/051368, filed on Jan. 21, 2021, which claims the benefit of U.S. Patent Application Ser. No. 62/965,241, filed on Jan. 24, 2020, the disclosures of which are incorporated herein by reference in their entireties. To the extent appropriate, a claim of priority is made to each of the above disclosed applications.

FIELD OF THE INVENTION

The present invention relates to telecommunications distribution systems, e.g., optical fiber distribution systems, which may include a rack and elements which populate the rack, wherein such fiber optic elements can include fiber terminations, patching, fiber splitters, and fiber splices.

BACKGROUND OF THE INVENTION

Optical fiber distribution systems may include fiber terminations and other equipment which is typically rack mounted. Various concerns exist for the optical fiber distribution systems, including density, ease of use and mounting, and cable management. There is a continuing need for improvements in the telecommunications distribution area, especially optical fiber distribution.

SUMMARY OF THE INVENTION

One implementation of a system in accordance with the examples of the disclosure includes a building block element mountable to a rack or other structure. The element includes a chassis and a movable tray. The tray is movably mounted to the chassis with a slide mechanism that allows the tray to slide relative to the chassis, wherein the tray may house equipment for fiber terminations, patching, splitting, and splicing.

The elements can be stacked in a column with each tray slideable in a horizontal direction. In the case of a column of elements, a selected tray is pulled outward to access the desired tray.

In an example embodiment of a fiber optic distribution element, one side of each element can be for patch cables, and the opposite side can be for cable termination of an incoming cable, such as a distribution cable or a feeder cable. The elements can be configured as desired and form building blocks for an optical fiber distribution system. When the elements are mounted in a column in a rack, the cables can be placed in vertical cable guides to enter and exit the selected element. An example rack may be front accessible. However, the elements shown and described can be used in other racks, frames, cabinets, or boxes including in arrangements where rear access is desirable or useful.

According to an aspect of the disclosure, the disclosure is directed to an optical fiber distribution element that includes a chassis defining an interior; a movable tray slidably movable from within the chassis to a position at least partially outside the chassis, the tray defining a front end and a rear end; a slide mechanism which connects the movable tray to the chassis; at least one hingedly mounted frame member within the tray which hinges about an axis perpendicular to the direction of movement of the movable tray; and a cover mounted adjacent the rear end of the tray and movable between an access position and an operational position when the tray is in the open position, only the operational position of the cover allowing the tray to move from the open position to the closed position, the access position allowing access to the at least one hingedly mounted frame member, and the cover in the access position preventing the tray from moving from the open to the closed position.

DETAILED DESCRIPTION

Figure 1:
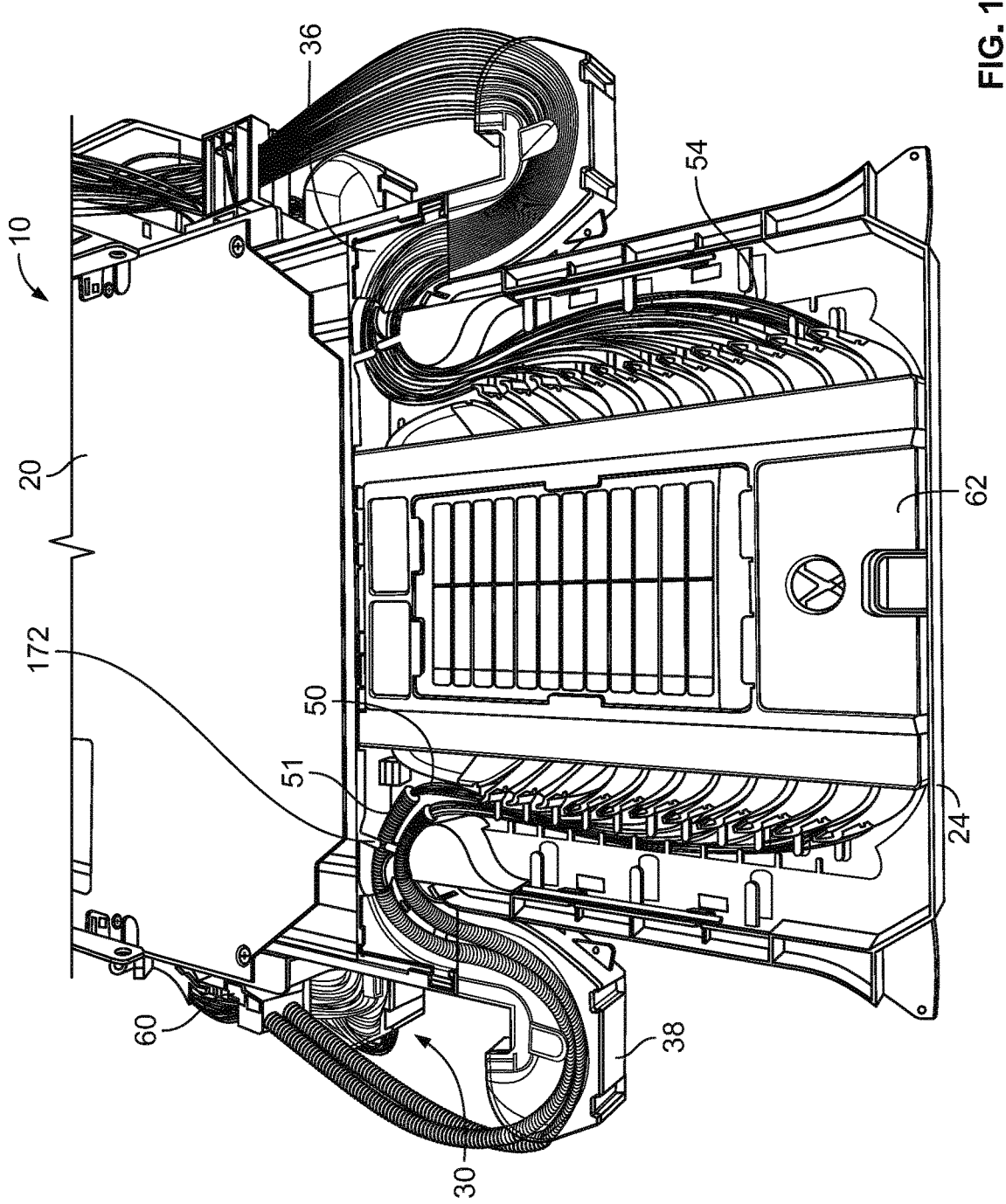
FIG. 1 is an embodiment of an optical fiber distribution element having features that are examples of inventive aspects in accordance with the present disclosure, the optical fiber distribution element depicted as a drawer-based dedicated splice element that includes within its tray cable management structures for guiding cabling to and from the hinged splice frames.

Referring now to FIGS. 1-11, various embodiments of an optical fiber distribution element 10 are shown. The element 10 can be individually mounted as desired to telecommunications equipment including racks, frames, or cabinets. The element 10 can be mounted in groups or blocks which can form a stacked arrangement. In one embodiment, a vertical stack of elements 10 can populate an optical fiber distribution rack.

Each element 10 can hold fiber terminations or other fiber components including fiber splitters and/or fiber splices.

The example depicted optical fiber distribution element 10 that is going to be referenced for describing the inventive features of the disclosure is a drawer-based dedicated splice element that includes, within its tray, cable management structures for guiding cabling to and from hinged splice frames (also referred to herein as splice trays).

As shown, the element 10 includes a chassis 20 and a movable tray 24. Tray 24 is movable with a slide mechanism 30. Slide mechanism 30 provides for synchronized movement for managing the cables extending to and from tray 24. Entry points 36 on either side of chassis 20 allow for fixation of the input and output cables associated with each element 10. U-shaped radius limiters 38 associated with each slide mechanism 30 move in synchronized movement relative to chassis 20 and tray 24 to maintain fiber slack, without causing fibers to be bent, pinched, or pulled.

Further details relating to such slide mechanisms that can be used in the distribution element 10 are described and illustrated in PCT Publication No. WO 2019/201878, the entire disclosure of which is hereby incorporated by reference.

Referring specifically to FIG. 1, as noted above, the depicted optical fiber distribution element 10 that is going to be referenced for describing the inventive features of the disclosure is a dedicated splice element that includes, within its tray, cable management structures for guiding cabling to and from the hinged splice frames.

In the depicted element, incoming outside plant (OSP) cabling 50 (e.g., 250 micron/900 micron optical fibers) may be directed to pivotally mounted splice frames 52 (may also be referred to as splice trays or pivot trays). Within the splice trays 52, each fiber of the OSP cable 50 may be spliced to a pigtail 54 (i.e., outgoing cabling) that may lead to another element or other points in the network such as other equipment or customer dwellings.

As shown, the incoming cabling 50 may follow a path from an exterior of the element 10, through U-shaped movable radius limiters 38, to the interior pivot trays 52. After the splice operation, the outgoing cabling 54 may follow a similar path, where the cabling 54 is routed through U-shaped radius limiters 38 at the opposite side of the elements 10. As shown, the incoming cabling 50 may be provided with strength members that are secured to the sides of the elements via cable fixation devices 60 such as those described in PCT Publication No. WO 2019/201878, which has been incorporated herein by reference.

Referring now to FIGS. 2-11, certain inventive interior features of the trays 24 of elements such as the element 10 shown in FIG. 1 will be described.

Figure 2:
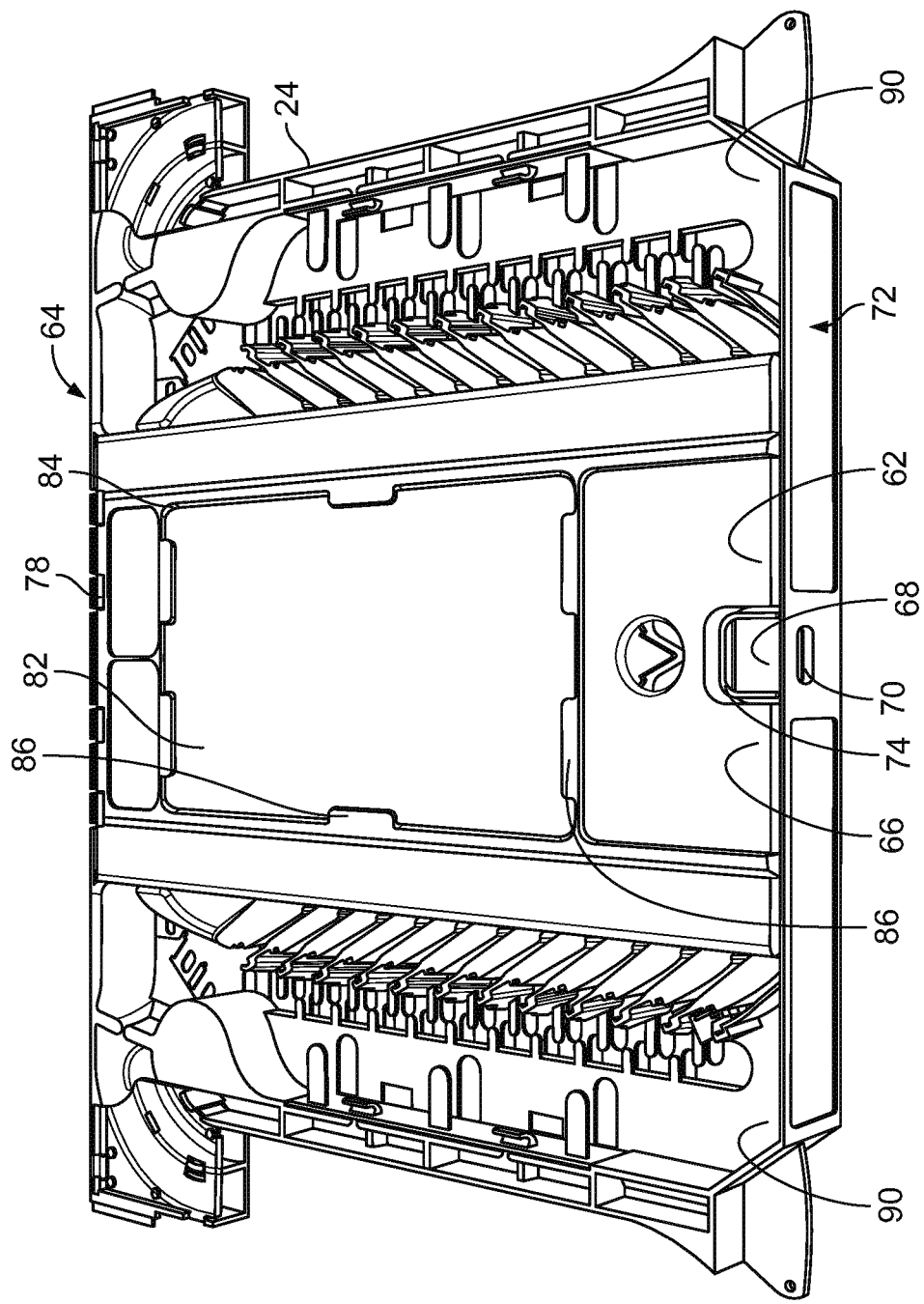
FIG. 2 illustrates the tray portion of the optical fiber distribution element of FIG. 1 in isolation removed from the chassis of the element.
Figure 3:
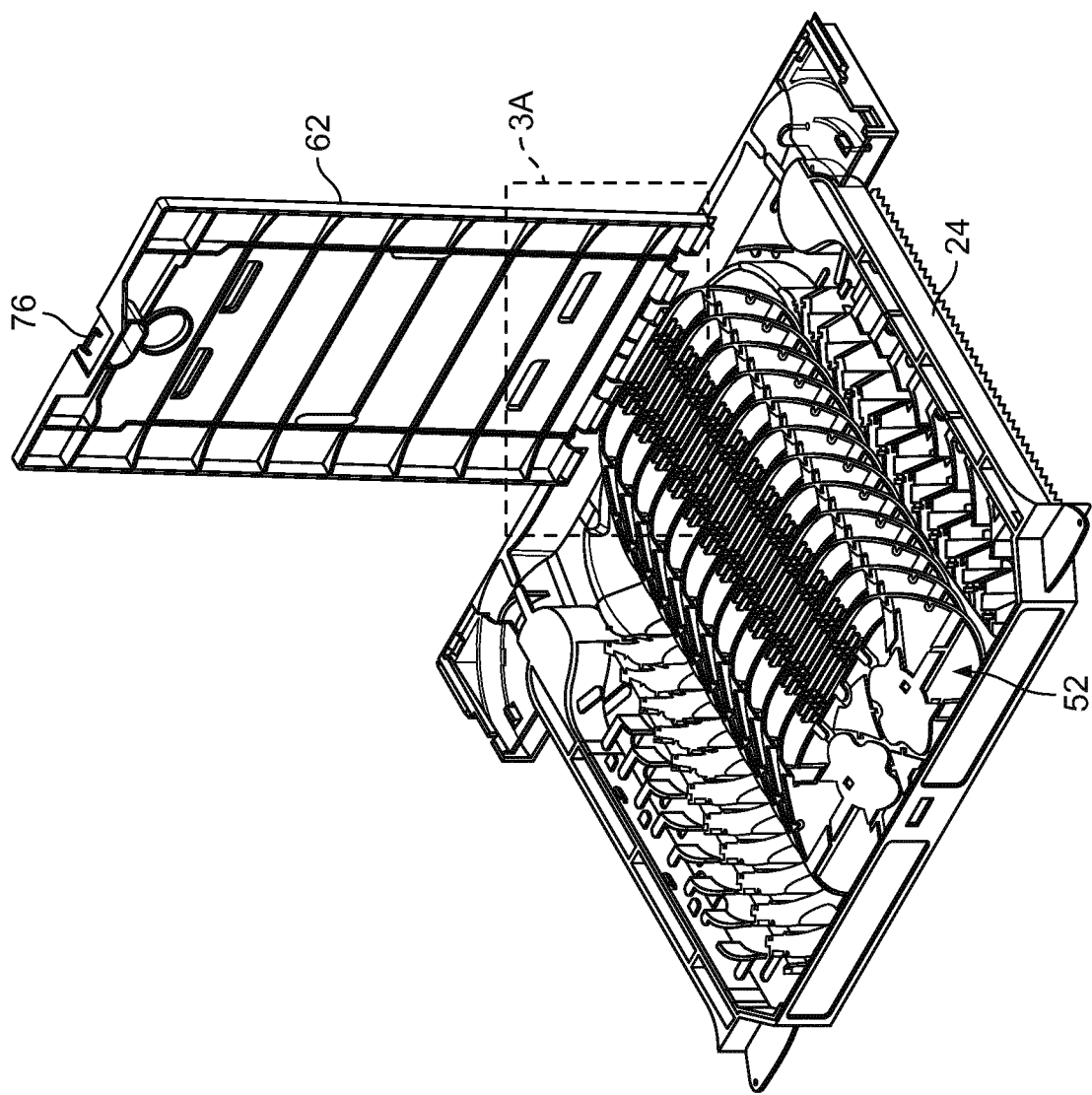
FIG. 3 shows the cover of the tray of FIG. 2 in an open position to illustrate the hinged splice frames provided within the tray.
Figure 3A:
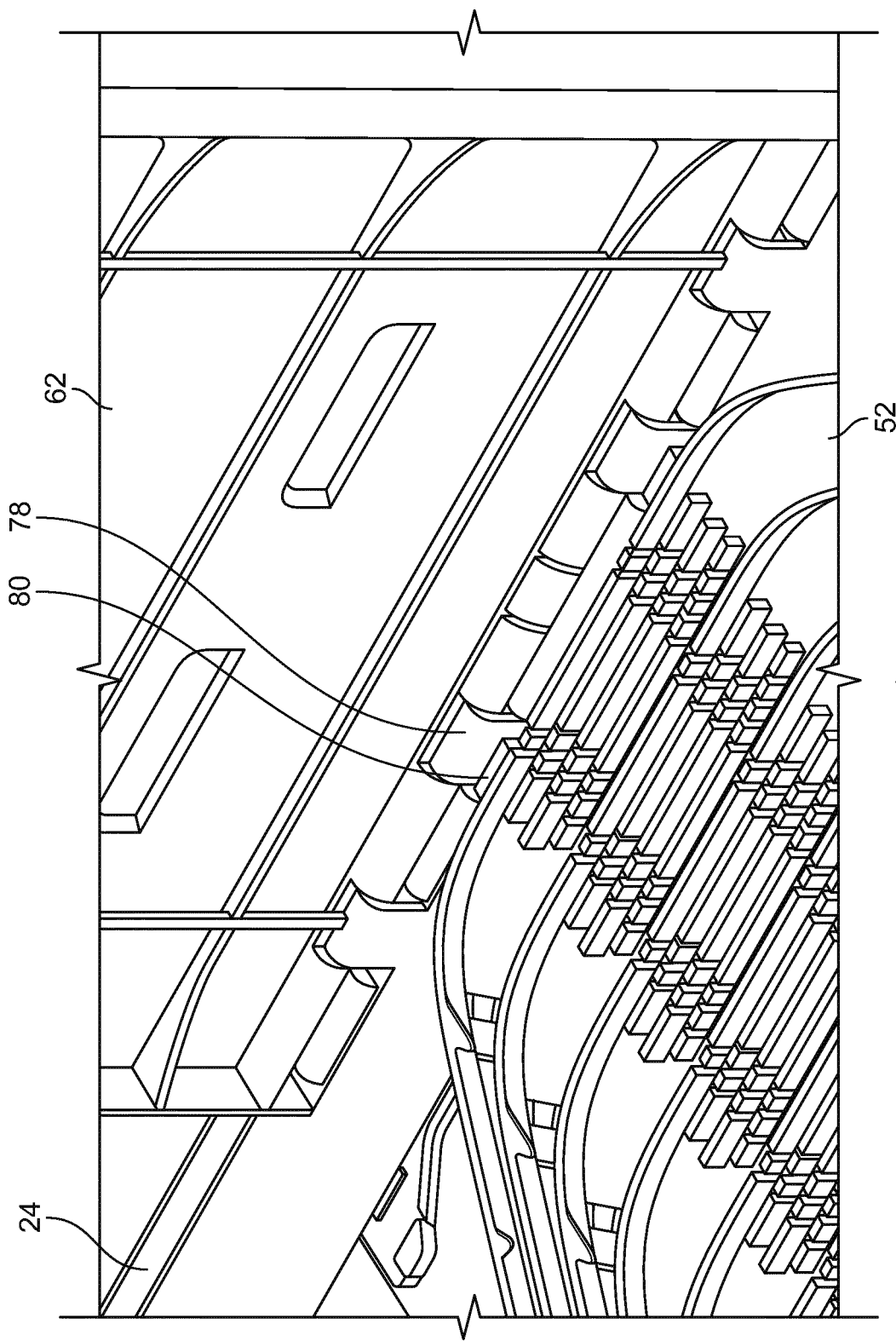
FIG. 3A shows a close-up view of the hinge of the cover of FIG. 3.

FIGS. 2-3 illustrate the details of a cover portion 62 of the tray 24 that is configured to protect the pivotally mounted splice frames 52 provided along a center portion of the tray 24. As shown, the cover 62 is hinged adjacent a back end 64 of the tray 24 and is openable in a front-to-back direction, where the cover 62 is pivotally liftable from a front end 66 of the cover 62. A flexible latch 68 provided at the front 66 of the cover 62 is used to keep the cover 62 closed by being snap-fit into a latch opening 70 provided at a front end 72 of the tray 24. A latch grip 74 can be elastically moved by a user in a front-to-back direction to free a latch lip 76 from the latch opening 70 before pivotally lifting the cover 62.

The arrangement of the cover 62 where the hinge is positioned at the back end 64 of the tray 24 provides a safety feature for protecting the splice trays 52 and the fibers therein within the tray 24. Each of the splice frames or trays 52 first must be pivoted down before the cover 62 itself can be brought down and snapped to a closed position. When the cover 62 is at an open position, slideable closure of the tray 24 is prevented by contact of the cover 62 with the chassis 20 of the distribution element 10. And, since closure of the cover 62 requires closure of each of the splice trays 52, accidental closure of the tray 24 and pinching or damaging any of the fibers within the splice trays 52 is prevented or at least limited.

Without the cover 62, if the tray 24 was closed with any of the splice trays 52 in an open position, a front edge of the top of the chassis 20 of the element 10 might damage the trays 52 or the fibers therein. To prevent such a closure and the potential resulting damage, cover 62 is configured to prevent movement of tray 24 to the closed position when cover 62 is not in the closed position itself as noted above. The closed position of the cover 62 may also be referred to as the operational position, and the open position of the cover 62 may be referred to as the access position where the splice trays 52 may be accessed.

A hinge 78 of the cover 62 and a hinge receiver 80 of the tray 24 may be configured such that the cover 62 remains or is locked in an open position when pivoted open. According to one example configuration, the hinge 78 of the cover 62 may utilize a square or other polygonal shaped cross-section where sharp edges of the cross-section provide temporary stops within the hinge receiver 80 to enable the cover 62 to remain open when brought to an open position. In such an example, the hinge 78 of the cover 62 and the hinge receiver 80 of the tray 24 provide a self-supporting locking system to keep the cover 62 in an open position without the need for further structures or features.

As also shown in FIG. 2, the cover 62 may be used to house a card 82 (i.e., identification card) that can be used to write or provide connectivity information thereon regarding the distribution element 10. The card 82 is removably mounted to a card slot 84 provided on the cover 62 via tabs 86 provided around the perimeter of the card slot 84. Even though the card 82 is removable from the cover 62, the cover 62 provides access to the card 82 such that distribution information can be written on the card 82 without removal from the cover 62.

Figure 4:
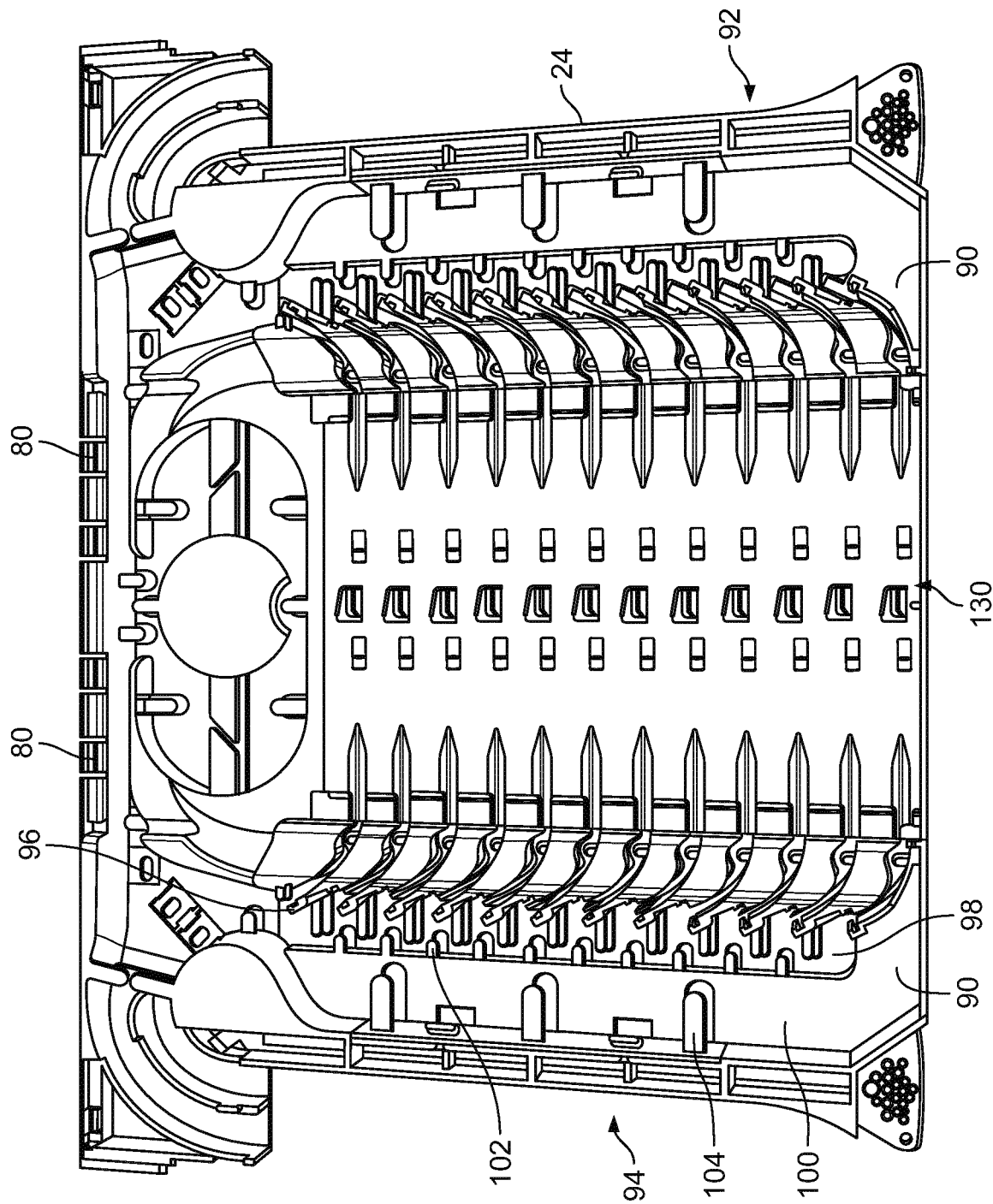
FIG. 4 shows the tray of FIGS. 2-3 without the cover or the hinged splice frames to illustrate the details of the inventive cable management structures within the tray.

FIG. 4 shows the tray 24 of FIGS. 2-3 without the cover 62 or the hinged splice frames 52 to illustrate the details of inventive cable management structures 90 within the tray 24.

As shown, a cable management structure 90 is provided at each of the right and left sides 92, 94 of tray 24. The cable management structures 90 are for guiding cabling to and from the hinged splice trays 52.

According to one example embodiment as depicted, the cable management structure 90 may be provided as a removable insert. As such, if the cable management insert 90 is damaged in any way, the insert may be replaced with another. In other embodiments, the cable management structure may be integrally molded with the tray of the distribution element 10.

In the depicted embodiment, each cable management insert 90 extends in a front-to-back direction, on opposing sides of the flip trays 52. A series of curved radius limiters 96 are provided for guiding cabling to and from the splice trays 52.

In the depicted example, each cable management insert 90 defines a double layered cable routing channel defined by a lower channel 98 and an upper channel 100, wherein cable management fingers 102 separate the lower channel 98 from the upper channel 100. According to an example configuration as shown in FIG. 1, the lower channel 98 may be used for 250 micron or 900 micron optical fibers 50 and the upper channel 100 may be used for the pigtails 54. The dual layered construction provides a physical separation between two different types of cabling and may provide extra protection to the smaller 250 micron or 900 micron optical fibers 50 in the lower channel 98. As shown, the upper channel 100 is also provided with cable retention fingers 104 extending into and partially covering the upper channel 100 for retaining the pigtails 54 within the upper channel 100.

Figure 5:
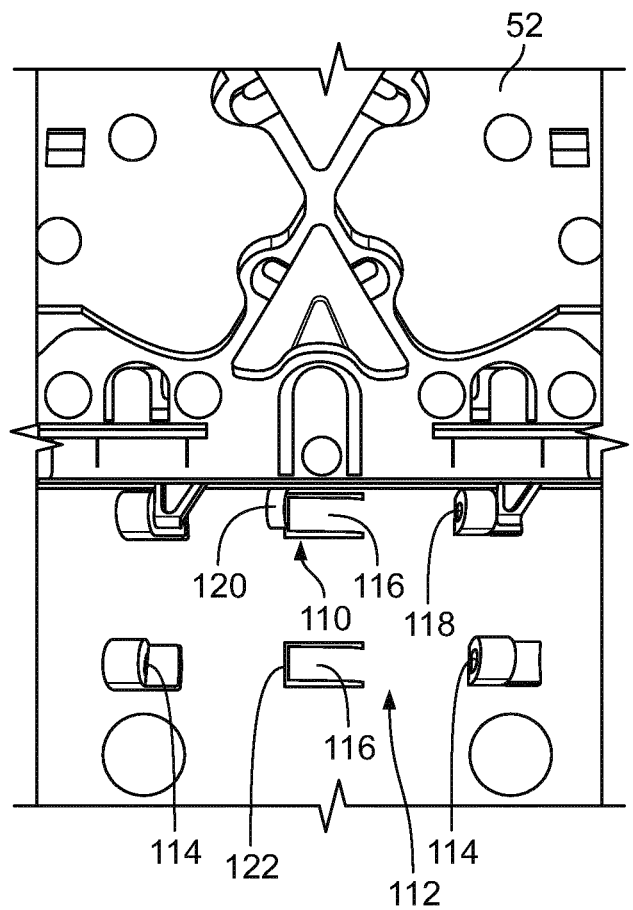
FIG. 5 illustrates a prior art version of the locking feature provided between a tray such as that shown in FIGS. 2-4 and a hinged splice frame therein for pivotally mounting the splice frame within such a tray.
Figure 6:
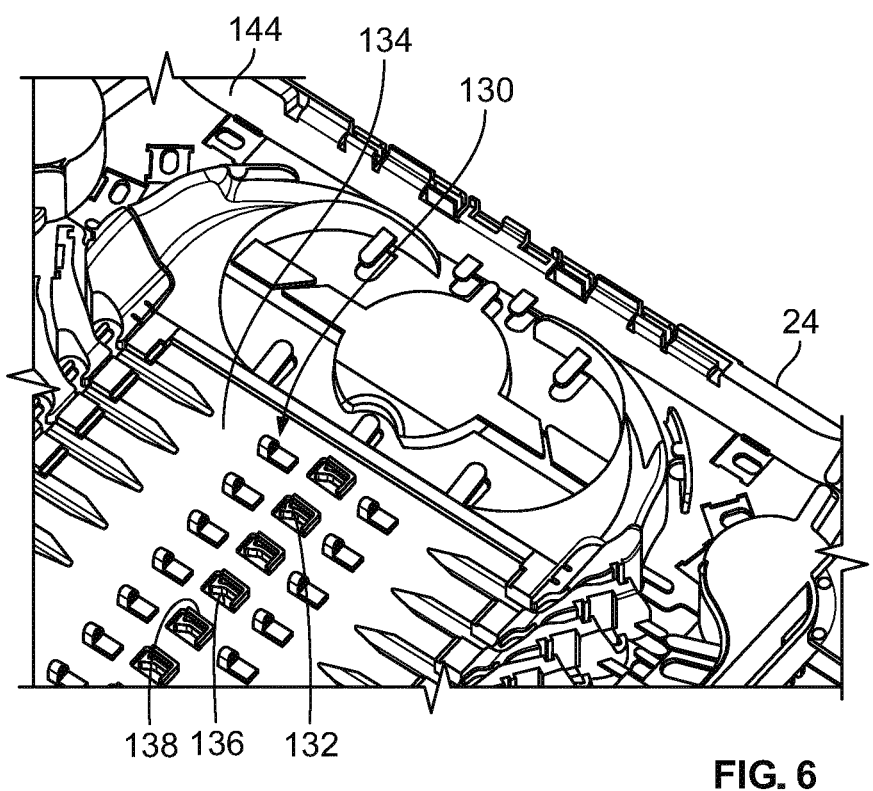
FIG. 6 illustrates a locking feature provided between the tray of FIGS. 2-4 and one of the hinged splice frames shown in FIG. 3 for pivotally mounting the splice frame within the tray, the locking feature having inventive aspects in accordance with the present disclosure.

Now referring to FIGS. 5 and 6, details on the locking feature for pivotally mounting the splice frames 52 to the tray 24 are illustrated.

FIG. 5 illustrates a prior art version of a locking feature 110 provided between a tray such as the tray 24 shown in FIGS. 2-4 and a hinged splice frame 52 therein for pivotally mounting the splice frame 52 within such a tray 24.

As shown in the example of FIG. 5, each frame mounting location 112 within the tray 24 defines hinge openings 114 and a flexible ramped tab 116 positioned between the hinge openings 114. Hinge pins 118 defined on each splice tray 52 are configured to be horizontally slidably inserted into the hinge openings 114 while a retention tab 120 defined on the splice tray 52 slides over and pushes down on the flexible ramped tab 116. Once the flexible ramped tab 116 is cleared, the retention tab 120 is locked in against a stop surface 122 defined by the ramped tab 116. In this manner, the splice trays 52 are limited from removal unless the ramped tab 116 is flexed down and the hinge pins 118 are slid.

FIG. 6 illustrates an improved version of a locking feature 130 provided between the tray 24 of FIGS. 2-4 and the hinged splice frames 52. In the version of FIG. 6, a flexible ramped tab 132 is provided with flexibility along a horizontal plane defined by a bottom surface/wall 134 of the tray 24, which is in a perpendicular direction relative to the flex direction shown for the version of the tab 116 in FIG. 5. As shown in FIG. 6, in the improved locking feature 130, the flexible ramped tab 132 is provided within an aperture 136 defined by the bottom wall 134 of the tray 24. Edges 138 defining the aperture 136 provide positive stops for the flexible ramped tab 132 so as to limit over-flexing of the ramped tab 132. In this manner, the flexible ramped tab 132 has a limit in its travel and is not as susceptible to breaking off.

In contrast, in the version of the locking feature 110 in FIG. 5, the flexible ramped tab 116 is not limited in its travel since the ramped tab 116 is not provided with any positive stops. Thus, repetitive flexing of the ramped tab 116 in FIG. 5 might result in faster deformation or failure of the tab 116 versus the ramped tab 132 shown in FIG. 6 which is provided with a positive stop.

Figure 7:
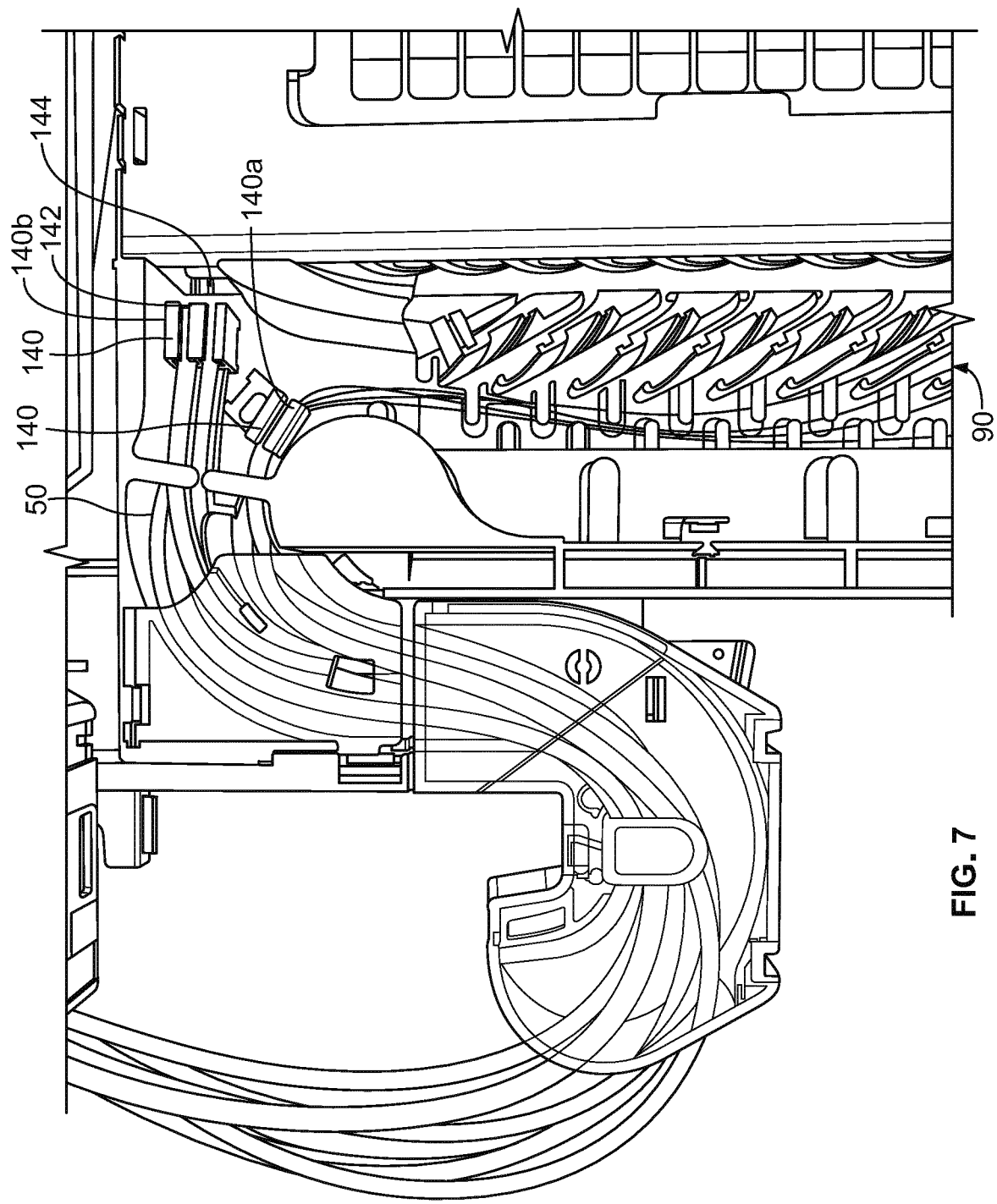
FIG. 7 illustrates an example version of a tube holder that is configured to be mounted within the tray of FIGS. 2-4 that can frictionally support fiber carrying tubes.

Referring now to FIG. 7, details relating to example tube holders 140 that are configured to be mounted within the tray 24 of FIGS. 2-4 that can frictionally support fiber carrying tubes 50 is discussed.

As shown, the tube holders 140 may be mounted so as to align with the channels of the movable U-shaped radius limiters 38 of the distribution elements 10. The tube holders 140 may be configured for tubes holding 250 micron fibers or for tubes holding 900 micron fibers, depending on the application. The tube holders 140 include friction members 142 which limit the amount of sliding movement of cables 50 passing through the tube holders 140, to assist with cable management. Friction members 142 grip lightly on the cables 50 in the tube holders 140 to reduce or eliminate sliding movement of the cables 50 therein.

Such tube holders 140 may also be positioned at various locations within the trays 24 for guiding of cabling in the preferred paths. As shown in an example layout in FIG. 7, one of the tube holders 140a is positioned to lead fiber carrying tubes 50 toward the cable management insert 90.

As also shown, a second tuber holder 140b may be positioned and may also cooperate with a channel 144 defined at the back 64 of the tray 24 to lead fiber carrying tubes to an opposite side of the tray 24 to provide for a side-switching concept. The second tube holder 140b that is shown to be provided at the rear 64 of the tray 24 can be mounted at either the right side 92 or the left side 94 of the tray 24 and may bypass the splice frames 52 on one side and lead fiber carrying tubes to the opposite side depending upon the connectivity need.

Figure 8:
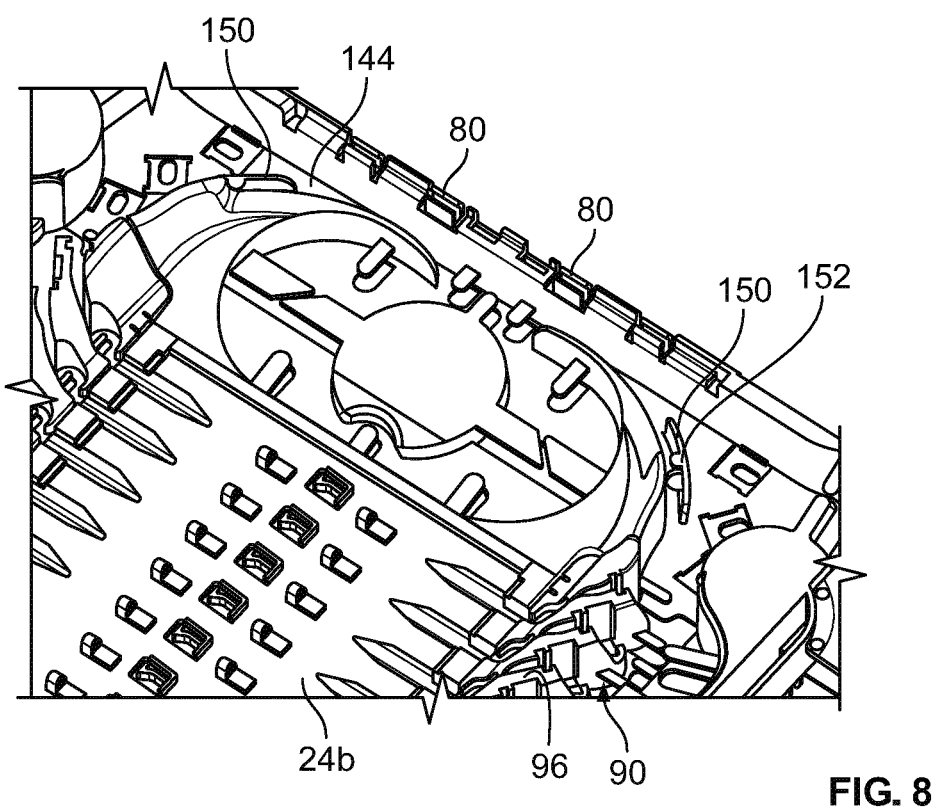
FIG. 8 illustrates another version of a tray similar to the tray of FIGS. 2-4 that includes a further cable management wall on both sides of the tray for guiding cabling within the tray.

FIG. 8 illustrates another version of a tray 24b similar to the tray 24 of FIGS. 2-4 that includes a further cable management wall 150 on both sides of the tray 24b for guiding cabling within the tray 24b. For example, the cable management walls 150 can cooperate with the cable channel 144 at the back 64 of the tray 24b and guide fiber holding tubes extending from an opposite side of the tray 24b toward the radius limiters 96 defined by the cable management insert 90 when a side-switching operation is performed. Each cable management wall 150 is provided with a cable retention finger 152 for retaining the cables.

Figure 10:
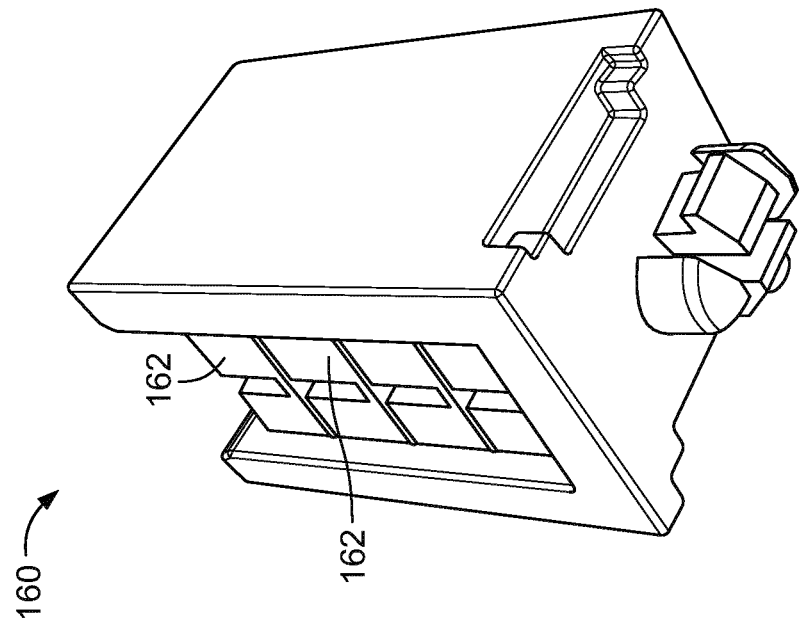
FIG. 10 is a bottom perspective view of the retainer of FIG. 9.
Figure 9:
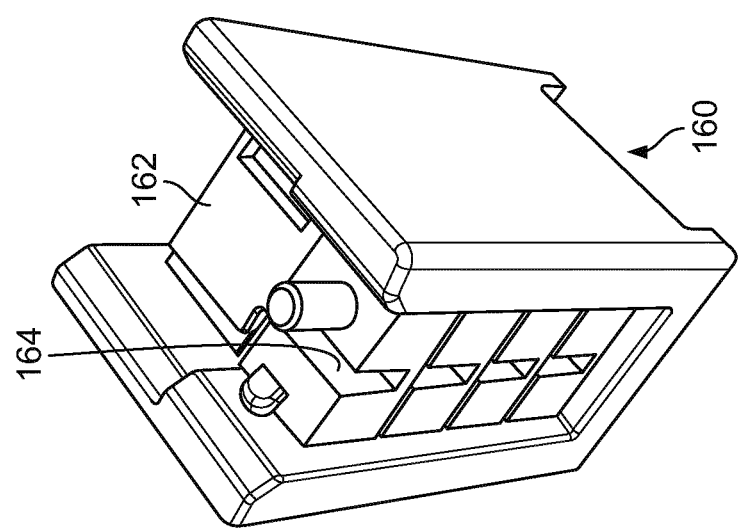
FIG. 9 is a top perspective view of a retainer configured to be mounted within a tray such as the tray of FIGS. 2-4, the retainer configured to hold a plurality of cable termination units in a stacked arrangement.

FIGS. 9-10 illustrate a retainer 160 configured to be mounted within a tray such as the tray 24 of FIGS. 2-4. The retainer 160 is configured to hold a plurality of cable termination units 162 in a stacked arrangement. The example retainer 160 has the same mounting interface as the above-discussed tube holders 140 and can be mounted at various locations within the tray 24. In the depicted embodiment, each retainer 160 is shown to hold four cable termination units 162 in a stacked arrangement. Other numbers are certainly possible depending upon connectivity need. The cable termination units 162 allow termination of cables inside the trays 24. A cable channel 164 is defined for receiving the cable. Strength members may be tied down or clamped within each cable termination unit 162 for securing the cables.

Figure 11:
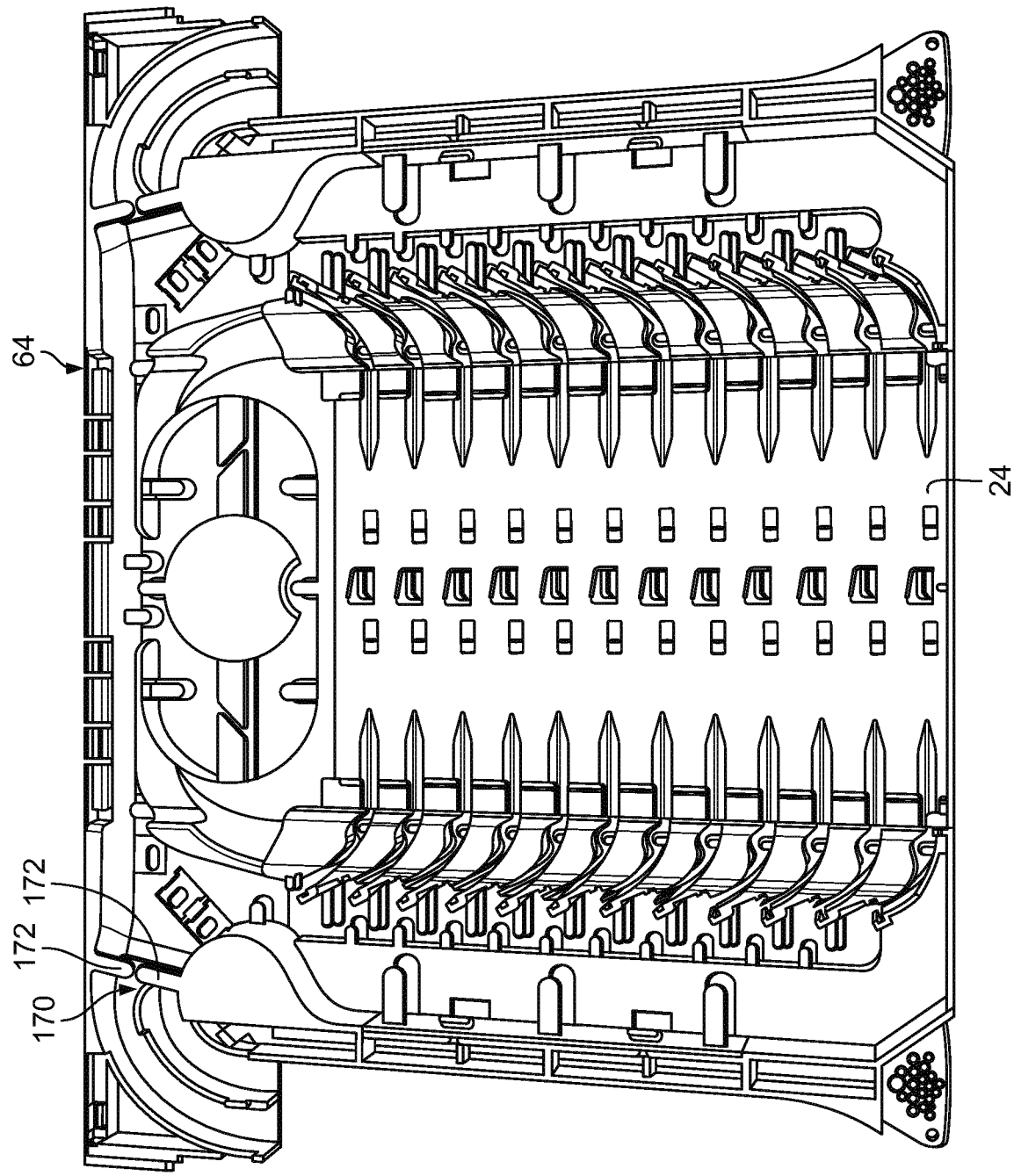
FIG. 11 is another top perspective view of the tray of FIGS. 2-4 shown without the cover or the hinged splice frames to illustrate an example of a cable retention feature having inventive aspects, the cable retention feature formed from two flexible fingers that provide a push-through design, the cable retention feature provided on both sides of the tray.

FIG. 11 illustrates an example of another cable retention feature 170 having inventive aspects. The cable retention feature 170 is shown to be used at both sides of the tray 24 adjacent to the back end 64 for transitioning cabling 50 (FIG. 1) from the U-shaped cable radius managers 38 to the main body of the tray 24. In one example, the cable retention feature 170 is formed from two flexible fingers 172 that provide a push-through design. The flexible fingers 172 allow cabling 50 surrounded by corrugated tubes 51 (i.e., flex tubes) or pigtails to be pushed through and retained thereunder.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An optical fiber distribution element comprising:
a chassis defining an interior;
a movable tray slidably movable from within the chassis to a position at least partially outside the chassis, the tray defining a front end and a rear end;
a slide mechanism which connects the movable tray to the chassis;
at least one hingedly mounted frame member within the tray which hinges about an axis perpendicular to the direction of movement of the movable tray; and
a cover mounted adjacent the rear end of the tray and movable between an access position and an operational position when the tray is in an open position, only the operational position of the cover allowing the tray to move from the open position to a closed position, the access position allowing access to the at least one hingedly mounted frame member, and the cover in the access position preventing the tray from moving from the open to the closed position;
wherein the at least one hingedly mounted frame member is removably mounted to the tray via a locking structure, wherein the locking structure is defined by a hinge pin and a spaced apart retention tab defined on the frame member and a hinge opening and a flexible tab defined on the tray, the hinge opening configured to receive the hinge pin in an insertion direction and the flexible tab configured to elastically flex along a horizontal plane defined by a bottom wall of the tray to receive the retention tab and to provide a stop surface to prevent slidable movement of the retention tab in a direction that is opposite of the insertion direction of the hinge pin into the hinge opening, and
wherein the flexible tab is provided within an aperture defined by the tray, wherein at least one edge of the tray that defines the aperture is configured to provide a positive stop to limit flexible movement of the flexible tab along the horizontal plane defined by the bottom wall of the tray.

2. The element of claim 1, wherein the tray includes a plurality of frame members hingedly mounted for independent movement, each of the frame members being coverable by the cover.

3. The element of claim 2, wherein the plurality of frame members are stacked along a line which is generally parallel to the direction of travel of the movable tray.

4. The element of claim 1, wherein the slide mechanism includes a radius limiter which moves with synchronized movement relative to the chassis and the tray during slidable movement of the tray.

5. The element of claim 1, wherein a cable entering or exiting the movable tray follows an S-shaped pathway as the cable extends between an exterior of the movable tray and the at least one hingedly mounted frame member.

6. The element of claim 1, wherein the at least one hingedly mounted frame member is configured to support a fiber optic splice.

7. The element of claim 1, wherein the cover includes a removable card for receiving indicia relating to fiber optic connectivity information within the movable tray.

8. The element of claim 1, wherein the cover includes a hinge that is received by a hinge receiver defined on the movable tray, the hinge of the cover and the hinge receiver of the tray cooperatively configured to automatically keep the cover in the access position when the cover has been brought to the access position.

9. The element of claim 1, further comprising a cable management structure within the tray for managing cables extending between the slide mechanism and the at least one hingedly mounted frame member within the tray, the cable management structure defining a two-layered structure defining a lower channel separated from an upper channel by cable management fingers.

10. The element of claim 9, wherein the cable management structure is provided as a removable insert.

11. The element of claim 9, wherein the tray includes two of the cable management structures, each located at an opposite side of the at least one hingedly mounted frame member.

12. The element of claim 11, wherein the tray includes therein a different type of cable within the upper channel of at least one of the cable management structures than the type of cable within the lower channel of at least one of the cable management structures.

* * * * *